March 2, 1965 O. E. RINGELHAAN 3,172,098
ANALOG TO DIGITAL CONVERTER
Filed Feb. 27, 1962
FIG. 1
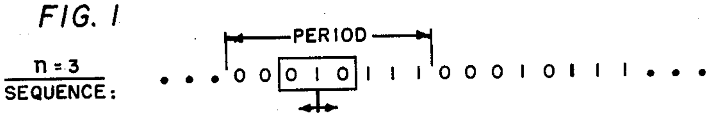
FIG. 2
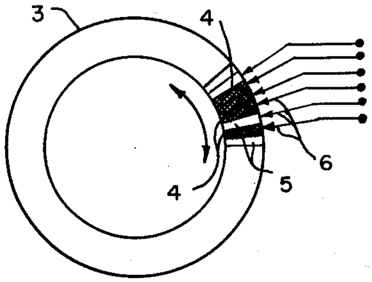
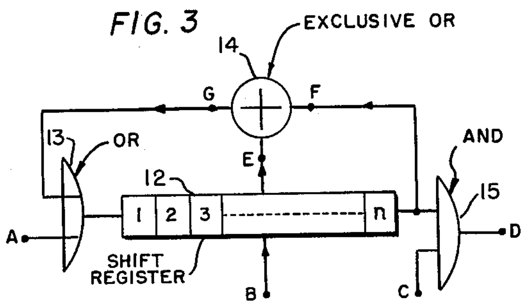
FIG. 4
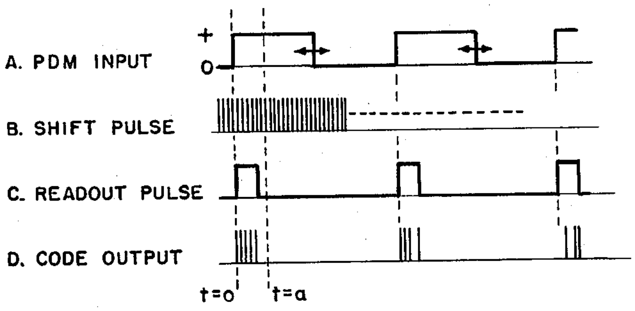
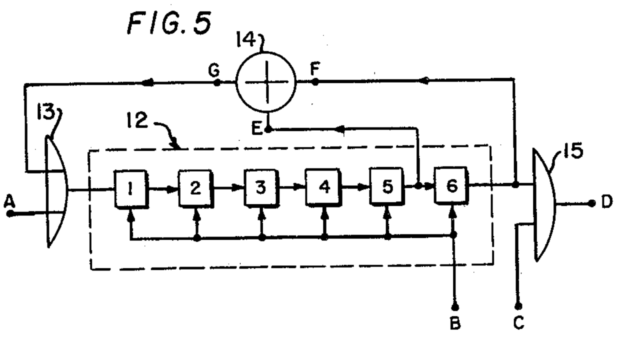
FIG. 6
| | | | | | |
|---|---|---|---|---|---|
| 1 | 1 | 1 | 1 | 1 | 1 |
| 0 | 1 | 1 | 1 | 1 | 1 |
| 0 | 0 | 1 | 1 | 1 | 1 |
| 0 | 0 | 0 | 1 | 1 | 1 |
| 0 | 0 | 0 | 0 | 1 | 1 |
| 0 | 0 | 0 | 0 | 0 | 1 |
| 1 | 0 | 0 | 0 | 0 | 0 |
| 0 | 1 | 0 | 0 | 0 | 0 |
| 0 | 0 | 1 | 0 | 0 | 0 |
| 0 | 0 | 0 | 1 | 0 | 0 |
| 0 | 0 | 0 | 0 | 1 | 0 |
| 1 | 0 | 0 | 0 | 0 | 1 |
| 1 | 1 | 0 | 0 | 0 | 0 |
| 0 | 1 | 1 | 0 | 0 | 0 |
| 0 | 0 | 1 | 1 | 0 | 0 |
| 0 | 0 | 0 | 1 | 1 | 0 |
| 1 | 0 | 0 | 0 | 1 | 1 |
| 0 | 1 | 0 | 0 | 0 | 1 |
| 1 | 0 | 1 | 0 | 0 | 0 |
| 0 | 1 | 0 | 1 | 0 | 0 |
| 0 | 0 | 1 | 0 | 1 | 0 |
| 1 | 0 | 0 | 1 | 0 | 1 |
| 1 | 1 | 0 | 0 | 1 | 0 |
| 1 | 1 | 1 | 0 | 0 | 1 |
INVENTOR,
OTMAR E. RINGELHAAN.
BY Jack H. Linscott
ATTORNEY.

United States Patent Office 3,172,098
Patented Mar. 2, 1965

3,172,098

ANALOG TO DIGITAL CONVERTER

Otmar E. Ringelhaan, Munich, Germany, assignor to the United States of America as represented by the Secretary of the Army Filed Feb. 27, 1962, Ser. No. 176,165
7 Claims. (Cl. 340—347)
(Granted under Title 35, U.S. Code (1952), sec. 266)

The invention described in the foregoing specification and claims may be manufactured and used by or for the Government for governmental purposes without the payment to me of any royalty thereon.

This invention relates to an analog-to-digital converter in which the analog quantity is translated into a pulse code.

Most analog-to-digital converters can be classified in one of two groups: those using straight binary code and those producing Gray code. The converter to be described herein produces a pseudo-random binary sequence code which is different from the above mentioned codes. Such a sequence has a period of $2^n$ digits and in the ideal case contains $2^n$ combinations of $n$ consecutive digits, each digit being a 0-pulse or a 1-pulse. The sequence has the property of being cyclic; that is, if the first digit of the sequence were placed adjacent the last digit, such as would occur if the sequence of digits were positioned around the circumference of a circle, all $2^n$ permutations could be obtained by observing each group of $n$ consecutive digits. Such an arrangement is known as a closed series. A corresponding open series may be obtained by adding $(n-1)$ starting digits to the end of the period or sequence.

One period of a pseudo-random binary sequence for $n=3$, for example, is 00010111. By adding the $(n-1)$ or two starting digits to the end of the period we obtain 0001011100, which is the open series. When all groups of three consecutive digits of the open series are observed, there will $2^n$ or eight possible permutations.

An application of the above teachings to encoding analog quantities could be accomplished by providing a physical window $n$ digits wide adjacent the sequence. The analog quantity to be encoded positions the sequence relative to the window so that the digits appearing in that window will be the encoded analog quantity.

A shaft encoder which utilizes a pseudo-random binary sequence has the advantage of requiring only one circle. This circle carries one period of the sequence over 360 degrees. The encoded shaft angle appears in a window which is positioned relative to the shaft and which is $n$ digits wide.

An analog quantity may be encoded in the time domain by using a maximum length shift-register generator. After some predetermined initial setting, the generator is driven for a length of time corresponding to the analog quantity. The state of the generator will then represent the appropriate code word. The shift register corresponds to the "window" of the previous examples, and a readout pulse, which causes the encoded state of the shift register to be read out through an "AND" gate, allows the code word in the "window" to appear as an output. Utilization of a maximum length shift-register generator to encode a time varying quantity such as a duration modulated pulse represents a simplification in circuitry over prior art methods.

It is an object of this invention to provide means for converting analog quantities into encoded digital quantities.

A further object of this invention is to provide a device for converting pulses which are modulated in duration into code pulses.

Other objects will appear from the following description, reference being made to the drawings in which:

FIGURE 1 shows a pseudo-random binary sequence for $n=3$;

FIGURE 2 shows a shaft angle encoder designed according to the present invention;

FIGURE 3 shows the preferred embodiment of this invention for converting pulse duration modulation into code pulses;

FIGURE 4 shows the waveforms which are present at various points in FIGURE 3;

FIGURE 5 shows a six stage shift register generator which may be used in practicing this invention; and FIGURE 6 shows a chart illustrating a portion of the sequence that will be generated by the converter of FIGURE 5.

With reference to FIGURE 1, a series of digits or bits is shown which represents two periods of a pseudo-random binary sequence. In this example $n=3$, and therefore window 2 encompasses three digits. The illustrated sequence has a period of $2^n$ or eight digits and contains eight possible combinations of $n$ consecutive digits. The analog quantity positions the sequence relative to window 2 so that the digits appearing in that window will be the encoded analog quantity. Starting at the left end of the sequence and moving toward the right end, the eight combinations of three digit codes are as follows: 000, 001, 010 (shown in the window), 101, 011, 111, 110 and 100.

The shaft angle encoder shown in FIGURE 2 is one example of implementation of such a sequence. The advantage of using this type of sequence in shaft angle encoders is that only one circle or disc is necessary. In this figure a single disc 3 has arranged thereon a plurality of conductive segments 4 and nonconductive segments 5 which are arranged in a pseudo-random binary sequence. As mentioned hereinabove, such a sequence is cyclic, so the circle is arranged to carry one period of the sequence over 360°. The encoded shaft angle appears at $n$ brushes 6 which sample the circle.

The preferred embodiment of this invention, which is shown in FIGURE 3, relies on an $n$-stage shift register to perform the function of the "window" of the previous examples. The function of this circuit is to convert a pulse duration modulation signal into code pulses.

FIGURE 3 shows an $n$-stage shift register 12, in block diagram form, having a conventional clock pulse or shift pulse input at terminal B. The input to the first stage of the register is connected to the output of an "OR" gate 13. One of the two input signals to the "OR" gate is the pulse duration modulation (PDM) signal which is to be converted to code pulses. This PDM input, which contains pulses that are modulated in duration by a displacement of their trailing edges, is applied to input terminal A. Input terminal F of "EXCLUSIVE OR" gate 14 is connected to the output of the $n$th stage, and input terminal E is connected to the output of a stage other than the $n$th stage. Output terminal G of gate 14 is connected to the second input of "OR" gate 13. One of the inputs to a readout "AND" gate 15 is connected to the output of the $n$th stage of the shift register generator while the other input is connected to readout pulse generator terminal C. The output of the "AND" gate is connected to an output terminal D which supplies code pulses to an external circuit.

The operation of the converter circuit of FIGURE 3 will now be explained, reference being made to the graphical representation of signals in FIGURE 4 to assist in the explanation. Various signals shown in FIGURE 4 are identified by letters A through D and appear at the corresponding lettered terminals in FIGURE 3.

A positive voltage at the input of the first stage of shift register 12 reads a "1" into that stage. The shift register is of conventional design, the outputs of the first through the $(n-1)$ stages being coupled to the next succeeding stage through a delay section (not shown). The shift pulses drive all stages to the "0" state. The coupling between stages is such that a succeeding stage will then be switched to the "1" state only if the preceding stage goes from the "1" state to the "0" state in response to the shift pulse. Zero potential appearing at the input of the first stage will cause a "0" to be read into that stage.

When the inputs at terminals E and F of the "EXCLUSIVE OR" gate 14 are similar, a "0" will be read from its output terminal G through "OR" gate 13 to the first stage of the register. When the inputs at terminals E and F are dissimilar, a "1" will be read through the same path to the first stage. Without this feedback loop through gate 14, the register would traverse only $n$ different states, and when all of the stages were in the "0" state, the register would remain in that condition. However, the number of possible variations or codes which the shift register may traverse is greatly increased by the addition of this feedback loop to the shift register.

Operation of the overall converter circuit will now be considered. At $t=0$ the PDM input at terminal A goes positive. This signal passes through "OR" gate 13 to the first stage of shift register 12, reading a "1" into that stage. At $t=a$, which is after the occurrence of $n$ shift pulses after the PDM input goes positive, all $n$ stages of the shift register are charged with "1's" through "OR" gate 13. This condition is retained until the PDM input goes negative, at which time a "0" is effectively read from terminal A through "OR" gate 13 to the first stage, the feedback loop through the "EXCLUSIVE OR" gate becomes effective and generation of a pseudo-random sequence begins. The readout pulse, which is connected to "AND" gate 15 through terminal C, connects $n$ pulses of this sequence to the output terminal D. The readout pulse occurs at some predetermined time relative to the leading or positive going edge of the PDM input signal. In the example illustrated by FIGURE 4 the positive going edges of both the PDM pulse and the readout pulse occur at the same time.

Consideration of a specific example may be helpful in understanding the operation of the converter. FIGURE 5 shows a six-stage shift register code converter and FIGURE 6 shows a portion of the sequence that will be generated by the converter. Various elements of the shift register of FIGURE 5 are numbered identically to those in FIGURE 3. In FIGURE 5, however, the stages of the register are individually represented since it is desired to indicate that the outputs of the fifth and sixth stages are to be connected to "EXCLUSIVE OR" gate 14.

At $t=a$ all six stages of the shift register are charged with "1's". This condition is illustrated in the first line of FIGURE 6. When the PDM input goes negative, "0's" are read from terminal A through "OR" gate 13 into the first stage of the register. This is the condition indicated by the second and subsequent lines in FIGURE 6. Also, "0's" will be generated by "EXCLUSIVE OR" gate 14 until the outputs of the fifth and sixth stages are dissimilar. The first occurs when a "0" advances to the fifth stage, the sixth stage still being in the "1" condition as illustrated in line 6 of FIGURE 6. From line 7 it can be seen that a "1" has been read into the first stage when this condition exists. The entire chart of FIGURE 6 will not be discussed since it can easily be derived from the operation of FIGURE 5. Similarly, the chart in FIGURE 6 could be extended to show all possible conditions of the shift register, but it is not thought necessary.

Some variations in the shift-register generator are readily apparent. For example, during readout the register may be driven at a different clockrate by the shift pulse generator. This variaton could be utilized to speed up the read-out. Also, part or all of the shift-register may be substituted by a delay line. Redundant encoding may be obtained by reading out more than $n$ consecutive pulses of the sequence.

Although the present invention has been described in connection with certain particular examples, various modifications incorporating the characteristics of the invention are possible, but it must be understood that these modifications are within the scope of this invention, as set forth in the following claims.

I claim:

1. A converter for translating a pulse duration modulation input into a multi-unit code comprising: a shift register having a plurality of binary stages, each of said stages having an input terminal and an output terminals; an OR gate having first and second input terminals and an output terminal, said OR gate output terminal being connected to said input terminal of the first of said shift register stages; a source of duration modulated pulses connected to said first OR gate input terminal; feedback means for increasing the maximum number of variations obtainable by said shift register connecting the outputs of at least two of said stages to said second OR gate input terminal; and gating means for passing a predetermined number of pulses appearing at the output of the last of said stages to an external circuit, said gating means being opened a predetermined time after the occurrence of the leading edge of said duration modulated pulses.

2. A converter as set forth in claim 1 wherein said feedback means comprises an EXCLUSIVE OR gate.

3. A converter as set forth in claim 1 wherein said gating means comprises an AND gate.

4. A converter for translating a pulse duration modulation input into a multi-unit code comprising: a shift register having a plurality of binary stages, each of said stages having an input terminal and an output terminal; an OR gate having first and second input terminals and an output terminal, said OR gate output terminal being connected to said input terminal of the first of said shift register stages; a source of duration modulated pulses connected to said first OR gate input terminal; an EXCLUSIVE OR gate having first and second input terminals and an output terminal, said first and second EXCLUSIVE OR input terminals being connected to said output terminals of two of said stages, said EXCLUSIVE OR output terminal being connected to said second OR gate input; an AND gate having first and second input terminals and an output terminal; a readout pulse source; means connecting said readout pulse source to said first AND gate input terminal; and means connecting said output of said last stage to said second AND gate input.

5. A converter as set forth in claim 4 wherein said source of duration modulated pulses produces pulses modulated in duration by time displacement of their trailing edge; the leading edges of said duration modulated pulses being coincident with the leading edges of the pulses produced by said readout pulse source.

6. A converter for translating a pulse duration modulation input into a multi-unit code comprising: a maximum length, recycling, random binary code generator; input gating means connected to said generator for applying duration modulated pulses thereto; output gating means connected to the output of said generator for gating the contents of said generator to an external circuit; and means for applying a gating pulse to said output gating means a predetermined time after the occurrence of the leading edge of said duration modulated pulses.

7. A converter for translating a pulse duration modulation input into a multi-unit code comprising: a shift register; feedback means connected to said shift register for producing a maximum length sequence; means for applying duration modulated pulses to said shift register and thereby applying "1's" to said register for the duration of said duration modulated pulses; and means for reading out the contents of said shift register a predetermined time after the occurrence of the leading edge of said duration modulated pulses, the readout occurring after said duration modulated pulse ceases so that said register has begun to produce a maximum length sequence.

References Cited by the Examiner

UNITED STATES PATENTS

| | | | |
|---|---|---|---|
| 3,046,545 | 7/62 | Westerfield | 235—181 X |
| 3,114,130 | 12/63 | Abramson | 340—146.1 |

MALCOLM A. MORRISON, *Primary Examiner.*